United States Patent [19]

Riikonen

[11] Patent Number: 4,679,816

[45] Date of Patent: Jul. 14, 1987

[54] WHEELCHAIR

[75] Inventor: Heikki Riikonen, Forssa, Finland

[73] Assignee: Tunturipyörä Oy, Finland

[21] Appl. No.: 868,578

[22] Filed: May 30, 1986

[30] Foreign Application Priority Data

Jun. 7, 1985 [FI] Finland ........ 852297
Feb. 14, 1986 [FI] Finland ........ 860693

[51] Int. Cl.⁴ ........ B62M 1/14

[52] U.S. Cl. ........ 280/650; 280/242 WC; 280/647; 297/DIG. 4

[58] Field of Search ........ 280/242 WC, 38, 642, 280/647, 650; 297/DIG. 4

[56] References Cited

U.S. PATENT DOCUMENTS

| | | | |
|---|---|---|---|
| 3,968,991 | 7/1976 | Maclaren | 280/242 WC |
| 4,023,825 | 5/1977 | Kassia | 280/650 |
| 4,078,823 | 3/1978 | McBride | 280/490 R |
| 4,351,540 | 9/1982 | Minnebrake | 280/242 WC |
| 4,500,102 | 2/1985 | Haury et al. | 280/242 WC |

*Primary Examiner*—John J. Love
*Assistant Examiner*—Donn McGiehan
*Attorney, Agent, or Firm*—William E. Mouzavires

[57] ABSTRACT

The invention relates to a wheelchair which comprises a body portion (1), back wheels (2) and front wheels (3). The wheels (2,3) are fastened to the body portion (1). The body portion (1) comprises side supports (4), upper supports (5) and lower supports (6), and a seat portion (7) is positioned between the side supports (4), a back (8) in connection with the upper supports, and a foot support (9) in connection with the lower supports (6). The back wheels of the wheelchair are detachable and the body portion is foldable when the wheelchair is changed from the using position to the transporting position. The side supports (4) are formed by two elongated members: an upper and a lower part (41) and (42) respectively which extend roughly horizontally in the transporting position, and a front and a back part (43) and (44) respectively which interconnect said horizontal parts and are shorter than said horizontal parts. The connection points between said parts (41,42,43,44) and the upper support (5) and the side supports (4) are provided with joints (45,46,47,48), at which points the body portion (1) is foldable to the transporting position. The joint (45) between the upper part (41) of the side support and the front part (43) thereof and the joint (47) between the lower part (42) and the back part (44) are supporting joints. At least one joint (47) of the two side supports is provided with a sleeve (49) or the like, which sleeve is displaceable on said joint (47) in the using position.

(FIG. 1).

9 Claims, 5 Drawing Figures

FIG. 1
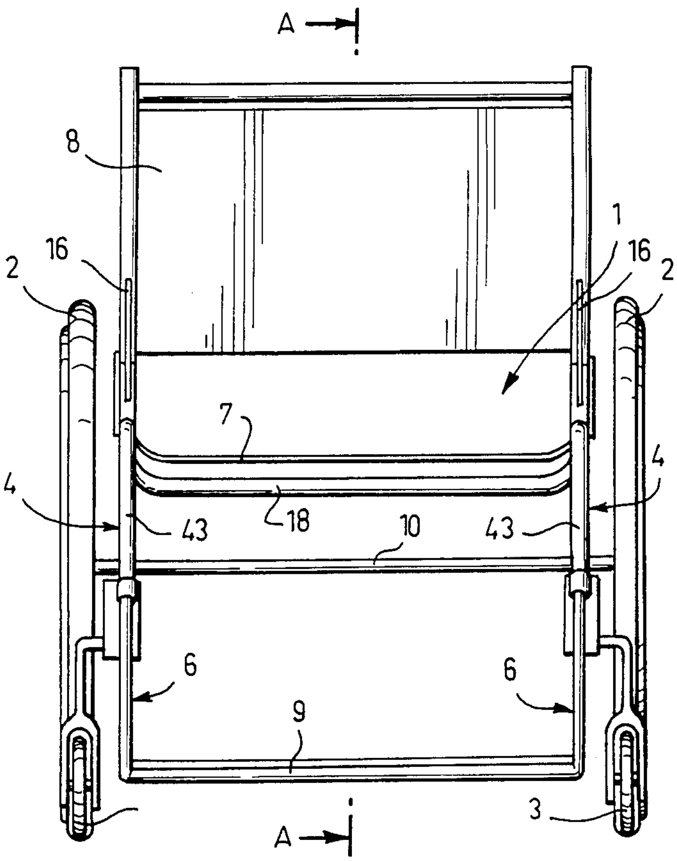
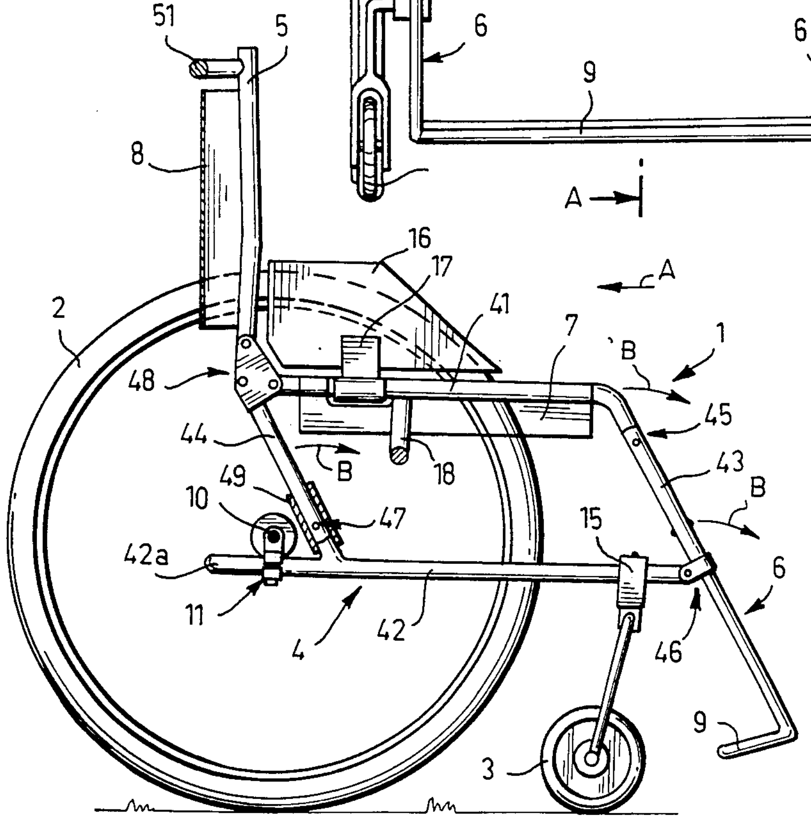
FIG. 2

FIG. 3
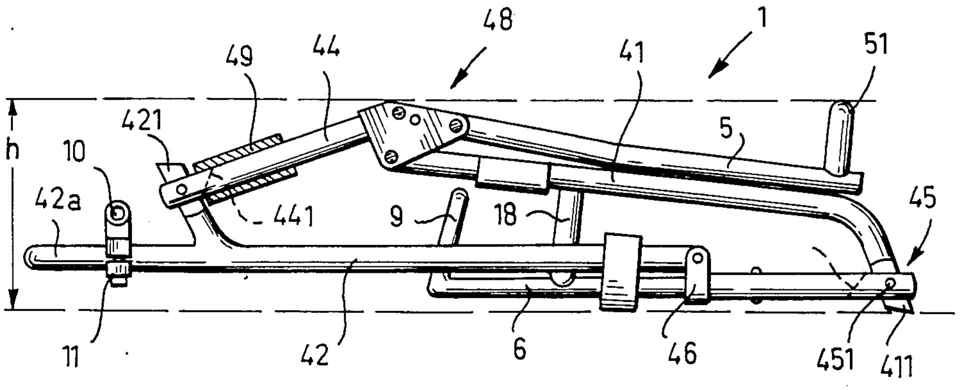
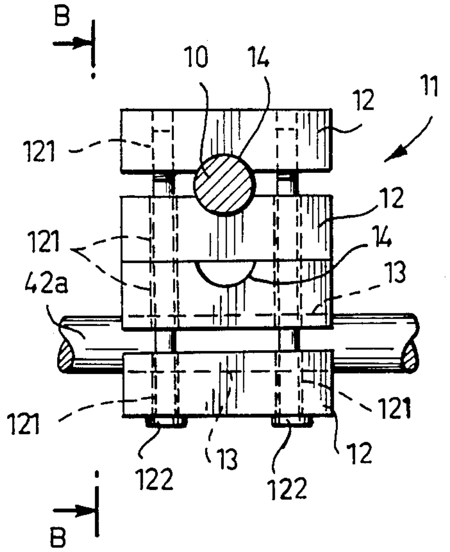
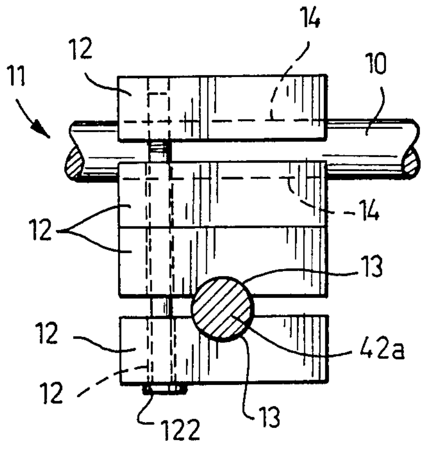
FIG. 4A
FIG. 4B

WHEELCHAIR

This invention relates to a wheelchair comprising a body portion, back wheels and front wheels, which wheels are fastened to the body portion and which body portion comprises side supports, upper supports and lower supports, a seat portion being positioned between said side supports, a back in connection with the upper supports and a foot support in connection with the lower supports, and in which wheelchair the back wheels are detachable and the body portion is foldable when the wheelchair is changed from the using position into the transporting position.

Such wheelchairs are previously known in which the back wheels are detachable and the back of the body portion of which can be folded against the seat portion when the wheelchair is changed from the using position to the transporting position. A major disadvantage of these known wheelchairs is that they take quite a lot of room in the transporting position; they are difficult to get fitted in the boot of a small motor-car or on the luggage rack of an aeroplane, for instance. On the other hand, known wheelchairs are also difficult to fold to the transporting position or to open to the using position as these steps must be carried out with both hands and with a relatively great force.

The object of the invention is to provide an improved wheelchair by means of which the above disadvantages can be avoided. For the achievement thereof the wheelchair according to the invention is characterized by the disclosure of claim 1 in particular.

The invention is advantageous mainly in that the wheelchair can be constructed in such a manner that the body portion thereof takes only a little room in the vertical direction in the transporting position so that it goes inside a motor-car, for instance. In addition, the wheelchair according to the invention is light in construction and durable. Further, the wheelchair can be easily changed from the using position to the transporting position or vice versa even with one hand on account of the light construction of the body and the proper positioning of the joints.

The invention will be described more closely below with reference to the attached drawings, wherein FIG. 1 is a front view of a wheelchair, FIG. 2 is a sectional side view of the wheelchair of FIG. 1 along the line A—A, FIG. 3 shows the body portion of the wheelchair in the transporting position, FIG. 4 shows an adjustable support of back wheel from the side in FIG. 4A and in the direction B—B in FIG. 4B.

The wheelchair is formed by a body portion 1, back wheels 2 and front wheels 3. The wheels 2, 3 are fastened to the body portion 1. The body portion 1 comprises side supports 4, upper supports 5 and lower supports 6. A seat portion 7 is positioned between the side supports 4, a back 8 in connection with the upper supports, and a foot support 9 in connection with the lower supports 6. The side supports 4 are interconnected by means of e.g. a central supporting arch 18 extending below the seat portion 7, a transverse upper supporting arch 51 of the upper support 5, and said foot support 9, which is attached to the lower support 6. The side supports 4 can also be interconnected by means of other kind of supporting arches, straight transverse supports, or the like. The back wheels 2 are detachable and the body portion 1 can be folded up when the wheelchair is changed from the using position to the transporting position.

The side supports 4 are formed by two elongated members; an upper and a lower part 41 and 42 respectively which extend roughly horizontally in the transporting position, and a front and a back part 43 44 respectively which interconnect said horizontal parts 41 and 42 and are shorter than said horizontal parts. The parts of side support 4 form a frame having roughly the shape of a quadrangle, preferably that of a parallelogram. The connection points between the upper and and lower parts 41, 42 and the front and back parts 43, 44 and the upper support 5 and the side supports 4 are provided with joints 45, 46, 47, 48, the wheelchair being foldable to the transporting position at said points.

The joint 45 between the upper part 41 of the side support 4 and the front part 43 thereof and the joint 47 between the lower part 42 and the back part 44 are preferably supporting joints on which the parts can be folded in one direction only when the wheelchair is changed from the using position to the transporting position. The other joints 46, 48 can be e.g. joints of a conventional cotter joint type.

In this embodiment of the invention the upper support 5 as well as the upper and the back part 41, 44 of the side support 4 are connected to one and the same joint frame at the joint 48 by means of connecting pins. The upper support 5 can also be attached by a joint to one of the parts of the side support, e.g. to the upper part 41 of the side support or a possible extension thereof, in some other way.

The supporting joint 45, 47 is formed by e.g. a conventional connecting pin 451, 471, by means of which the parts 41, 43 and 42, 44 are interconnected, and by counter surfaces 411, 431 and 421, 441 (FIG. 3) formed on said parts so as to have an inclination with respect to the longitudinal direction of said parts. The counter surfaces allow the supporting joint to be turned in one direction only with respect to the supported position, i.e. the using position of the wheelchair. The supporting joints can, of course, be effected in various other conventional ways.

At least one joint 47 of the each side support 4 is provided with a sleeve 49, slide or the like member, which is displaceable along the part 44 of the side support and which is displaceable to the connection point between the parts 42 and 44 to support the joint 47. This ensures the locking of the side support 4 into the using position. When the sleeve 49 or the like is displaced away from the joint 47, the side supports 4 and the entire body portion 1 can be easily folded to the transporting position.

The back wheels 2 are interconnected preferably by means of a shaft 10 known per se. The shaft 10 is connected to the lower part 42 of the side support 4, preferably to an extension 42$a$ of the lower part 42, which extension is positioned behind the connection point between the lower part 42 and the back part 44 as viewed from the front A. The shaft 10 is preferably fastened to the lower part 42 of the side support 4 by means of an adjustable support 11. This support enables the position of the shaft 10 with respect to the side support 4 to be altered. It is to be understood that the shaft 10 can also be fastened to the side support 4 by means of a stationary fastening support.

FIGS. 4A and 4B show one structure of the adjustable support 11. Each adjustable support 11 is formed by matching pieces 12. Each piece comprises first grooves 13 for the lower part 42 of the side support 4 and second grooves 14 for the shaft 10, which interconnects the back wheels 2. The number and the position of the pieces 12 can be varied so as to adjust the seat of the wheelchair to a desired height and to adjust the position of the back wheels. The pieces 12 are preferably provided with holes 121 and fastening screws 122. The pieces 12 are pressed against each other, the shaft 10 and the lower part 42 by means of said screws 122.

Both front wheels 3 are fastened to the lower support 42 of the side support 4, preferably detachably by means of instant locking means 15. The upper parts 41 of the side supports 4 are provided with detachable cover plates 16. The side support 4 is preferably provided with a plate support 17 comprising a groove for said cover plate 16. The cover plate 16 can be e.g. locked into the groove or it can be fastened on the groove simply by pushing, and it is kept in place by means of friction. The cover plates are preferably made of plastic and cut directly into the desired shape.

The lower supports 6 are preferably formed as direct extensions of the front part 43 of the side support 4. The height of the lower supports 6 and, consequently, that of the foot supports 9 can be adjusted by pushing the lower supports 6 inside the front part 43 of the side supports 4 or by drawing out the same. The lower supports 6 can be locked in place.

The upper support 5 can have several inclined positions in which said support and the back can be locked in a suitable manner.

The wheelchair is changed from the using position to the transporting position in the following way. The cover plates 16 are removed. The front wheels 3 are turned outwards, or if they are provided with instant locking means, they are detached. The sleeves 49 are lifted up one by one from the joints 47. The sleeves are maintained in the upper position by means of e.g. friction. The upper supports 5 and the back 8 are folded against the seat 7 on the joint 48. At the same time or immediately thereafter the side supports 4 are folded on the joints 45, 46, 47 and 48 in the direction B, i.e. forwards, whereby the body portion 1 is in the transporting position shown in FIG. 3. Thereafter the back wheels 2 are removed. These are preferably provided with instant locking means so that they can be detached and drawn out from the shaft 10 without difficulty.

The different parts of the wheelchair can now be positioned e.g. in the boot of a motor-car or inside the car. It is to be noted that the greatest height h (FIG. 3) of the body portion 1 in the transporting position is approximately 20 cm so that the body portion can be placed on the luggage rack of a passenger plane, for instance.

The wheelchair is changed to the using position in such a manner that the upper supporting arch 51, which also acts as a pushing handle, is seized by hand and the body portion 1 is pulled open from the transporting position shown in FIG. 3. The joints 47 are locked in position one by one by means of the sleeves 49. The wheels 2, 3 are mounted in place and the cover plates 16 are fastened, whereafter the wheelchair is in the using position and ready for normal use.

What is claimed is:

1. A wheelchair comprising a body portion (1), back wheels (2), and front wheels (3), which wheels (2, 3) are fastened to the body portion (1) and which body portion comprises side supports (4), upper supports (5), and lower supports (6), a seat portion (7) being positioned between said side supports (4), a back (8) in connection with the upper supports, and a foot support (9) in connection with the lower supports (6), and in which wheelchair the back wheels (2) are detachable and the body portion (1) is foldable when the wheelchair is changed from the using position into the transporting position, characterized in that the side supports (4) are formed by two elongated members: an upper and lower part (41) and (42) respectfully which extend roughly horizontally in the transporting position, and a front and back part (43) and (44) respectively which are pivoted to and interconnect said horizontal parts and are shorter than said horizontal parts; said lower supports (6) being fixed to said front parts (43) respectively while extending below said lower parts (42) respectively such that the lower supports (6) are movable in a rearward direction to extend generally horizontally adjacent the lower parts (42) when the wheelchair is moved into the transporting position.

2. A wheelchair according to claim 1, including a joint (45) between the upper part (41) of the side support (4) and the front part (43) thereof and a joint (47) between the lower part (42) and the back part (44) allowing the parts to be folded in one direction only when the wheelchair is changed from the using position into the transporting position.

3. A wheelchair according to claim 2, characterized in that at least one joint (47) of the two side supports (4) is provided with a sleeve (49) or the like which is displaceable on said joint (47), which step ensures the locking of the side support (4) and the wheelchair into the using position, or away from the joint (47), whereafter the side supports (4) and the entire body portion are foldable to the transporting position.

4. A wheelchair according to claim 1 characterized in that the back wheels (2) are interconnected by means of a shaft (10) fastened to an extension (**42*a*) of said lower part (42), which extension is positioned behind the connection point between the lower part (42) and the back part (44); and that the shaft (10) is fastened to the lower part (42) of the side support (4) by means of an adjustable support (11) by means of which the position of the shaft (10) with respect to the side support (4**) can be altered.

5. The wheelchair defined in claim 1 further including a generally U-shape support (18) fixed to and between said upper and lower parts below said seat position (7).

6. A foldable wheelchair having a forward-rearward direction and a body portion including upper and lower supports (41 and 42) extending longitudinally in the forward-rearward direction and front and back supports (43 and 44) pivotally interconnected to said upper and lower supports to form a four bar linkage, a backrest support (5) fixed relative to said back support (44) and being pivotable forwardly with said back support (44) relative to said upper and lower supports to collapse said linkage into a storage position, and a foot support (6) fixed to said front support (43) and extending below said lower support (42) while being movable rearwardly in the forward-rearward direction into a folded position adjacent the plane of the lower support (42) when said four bar linkage is moved to the storage position.

7. The wheelchair defined in claim 6 including a rear-wheel axle (10) and means (11) adjustable along said lower support (42) mounting said axle on said lower support.

8. The wheelchair defined in claim 7 including a front wheel (3) removably mounted on said lower support (42) adjacent a front end portion thereof.

9. The wheelchair defined in claim 7 wherein said lower support has a rearwardly directed extension (42*a*), and said means (11) is mounted on said extension.

* * * * *